US012079266B2

(12) United States Patent
Tian et al.

(10) Patent No.: US 12,079,266 B2
(45) Date of Patent: Sep. 3, 2024

(54) IMAGE-ASSISTED FIELD VERIFICATION OF QUERY RESPONSE

(71) Applicant: MOTOROLA SOLUTIONS, INC., Chicago, IL (US)

(72) Inventors: Yong Tian, Sichuan (CN); Lee M. Proctor, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 109 days.

(21) Appl. No.: 17/756,674

(22) PCT Filed: Dec. 17, 2019

(86) PCT No.: PCT/CN2019/125830
§ 371 (c)(1),
(2) Date: May 31, 2022

(87) PCT Pub. No.: WO2021/119977
PCT Pub. Date: Jun. 24, 2021

(65) Prior Publication Data
US 2022/0414141 A1    Dec. 29, 2022

(51) Int. Cl.
*G06V 10/764* (2022.01)
*G06F 3/0484* (2022.01)
(Continued)

(52) U.S. Cl.
CPC .......... *G06F 16/532* (2019.01); *G06F 3/0484* (2013.01); *G06V 10/75* (2022.01);
(Continued)

(58) Field of Classification Search
CPC ....... G06V 10/764; G06V 40/168–173; G06V 20/52
See application file for complete search history.

(56) References Cited

U.S. PATENT DOCUMENTS 8,433,140 B2 * 4/2013 Ke ....................... G06V 10/751
382/209
10,061,835 B2    8/2018 Blanco et al.
(Continued)

FOREIGN PATENT DOCUMENTS

CN    101630361 A    1/2010
CN    105279475 A    1/2016
(Continued)

OTHER PUBLICATIONS

International Search Report and Written Opinion for Application No. PCT/CN2019/125830 dated Sep. 22, 2020 (9 pages).

*Primary Examiner* — Frank Johnson
(74) *Attorney, Agent, or Firm* — Michael Best & Friedrich LLP

(57) ABSTRACT

Processes and systems for displaying information received in a query response. One system includes a communication device including a user interface and an electronic processor. The electronic processor transmits a query, and receives a response to the query including stored information in each of a plurality of fields of information about an object of interest. The electronic processor receives an image of the object from a camera, identifies visually descriptive text information describing the object, and categorizes at least a portion of the visually descriptive text information into the plurality of fields of information. The electronic processor determines a confidence level for each field of information based on a comparison of the stored information and the visually descriptive text information in each field, and displays the stored information in one or more fields for which the confidence level of the comparison is below a predetermined threshold.

17 Claims, 6 Drawing Sheets

(51) Int. Cl.
*G06F 16/532* (2019.01)
*G06V 10/75* (2022.01)
*G06V 10/94* (2022.01)
*G06V 20/50* (2022.01)
*G06V 20/62* (2022.01)
*G06V 20/70* (2022.01)

(52) U.S. Cl.
CPC .......... *G06V 10/764* (2022.01); *G06V 10/945* (2022.01); *G06V 20/50* (2022.01); *G06V 20/62* (2022.01); *G06V 20/70* (2022.01)

(56) References Cited

U.S. PATENT DOCUMENTS

| | | |
|---|---|---|
| 10,867,219 B2 | 12/2020 | Koskan et al. |
| 2003/0126121 A1* | 7/2003 | Khan ............... G06F 18/00 707/E17.02 |
| 2006/0282771 A1 | 12/2006 | Vinci |
| 2009/0112800 A1 | 4/2009 | Athsani |
| 2011/0288909 A1* | 11/2011 | Hedley ............... G06Q 50/30 705/13 |
| 2015/0049914 A1* | 2/2015 | Alves ............... G06V 20/63 382/105 |
| 2015/0121292 A1* | 4/2015 | Blanco ............... G06F 16/284 715/780 |
| 2015/0213376 A1* | 7/2015 | Ideses ............... G06N 20/00 706/12 |
| 2015/0341370 A1* | 11/2015 | Khan ............... H04L 63/20 726/30 |
| 2016/0275518 A1* | 9/2016 | Bowles ............... G06V 40/166 |
| 2016/0300119 A1* | 10/2016 | Silva ............... G06F 16/248 |
| 2017/0351909 A1* | 12/2017 | Kaehler ............... G06F 18/2148 |
| 2017/0372161 A1* | 12/2017 | Almeida ............... G06F 18/256 |
| 2018/0189561 A1* | 7/2018 | Bertan ............... G06V 30/412 |
| 2018/0350354 A1 | 12/2018 | Mariaskin et al. |
| 2019/0066492 A1* | 2/2019 | Nijhuis ............... G06V 20/52 |
| 2019/0197090 A1 | 6/2019 | Ito |
| 2019/0217425 A1 | 7/2019 | Rollend et al. |
| 2020/0042773 A1* | 2/2020 | Benkreira ............... G06V 40/45 |
| 2020/0250405 A1* | 8/2020 | Ming ............... G06V 40/172 |
| 2021/0004589 A1* | 1/2021 | Turkelson ............... G06V 30/19173 |
| 2021/0124919 A1* | 4/2021 | Balakrishnan ............... B42D 25/309 |

FOREIGN PATENT DOCUMENTS

| | | |
|---|---|---|
| CN | 107346435 A | 11/2017 |
| CN | 110472485 A | 11/2019 |

* cited by examiner

IMAGE-ASSISTED FIELD VERIFICATION OF QUERY RESPONSE

BACKGROUND OF THE INVENTION

Tablets, laptops, phones (for example, cellular or satellite), mobile (vehicular) or portable (personal) two-way radios, and other communication devices are now in common use by users, for example, first responders (including firemen, police officers, and paramedics, among others). These communication devices provide users with instant access to increasingly valuable additional information and resources, for example, vehicle histories, arrest records, outstanding warrants, health information, real-time traffic or other situational status information, and any other information that may aid the user in making a more informed determination of an action to take or how to resolve a situation, among other possibilities.

Many such communication devices also include, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, a parsed natural language input or an electronic touch interface manipulation associated with an explicit request) in which the electronic digital assistant may reactively provide requested valuable information, or may be based on some other set of one or more context or triggers in which the electronic digital assistant may proactively provide valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers (for example, traffic accidents or environmental hazards), and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1A:
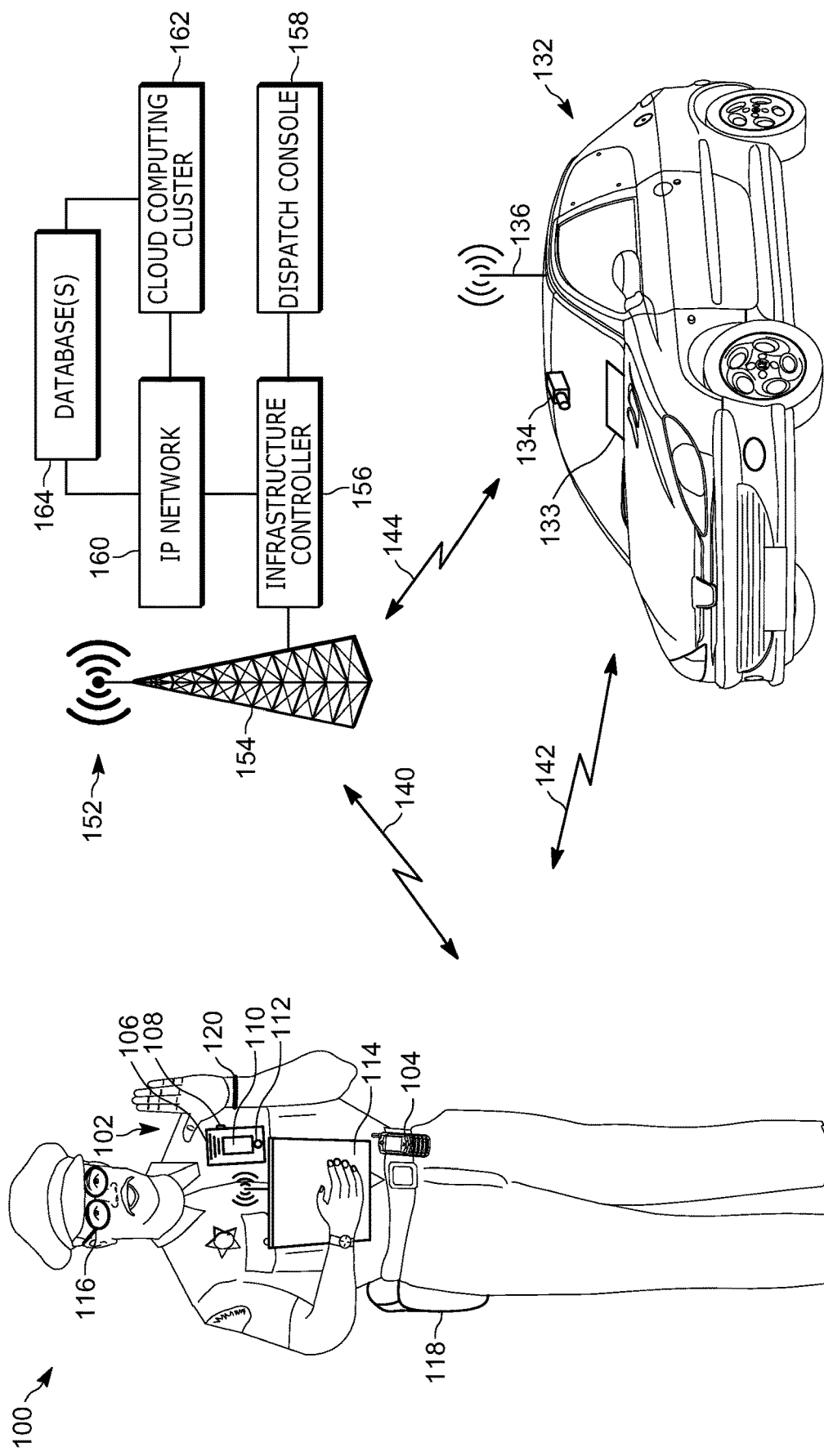
FIGS. 1A and 1B are system diagrams illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The device and process components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public safety officers may be called to a public safety incident to provide assistance in resolving or preventing a societal or environmental problem (for example, a location where a suspect is committing or has committed a crime, a fire, a vehicular accident, a traffic stop, a location where a natural disaster such as a tornado or earthquake has occurred, and the like). In some embodiments, public safety incidents include incidents involving public service agencies (for example, waste disposal agencies, water management agencies, and the like). In some embodiments, public safety officers include police officers, paramedics, firefighters, dispatchers, and the like. In some embodiments, public safety officers include public service employees employed by public service agencies.

In some situations, a public safety officer may desire to obtain identification information about people or objects of interest present at an incident scene. To obtain such identification information, the public safety officer may use a communication device to request that the communication device perform a query to retrieve such identification information. For example, the request may be a background check of a person with whom the public safety officer is communicating. The background check may return details related to the person (for example, height, weight, hair color, criminal record, and the like). As another example, the request may be a license plate check to determine details related to a vehicle (for example, make, model, year, color, ownership information, whether the vehicle has been reported as stolen, and the like). The communication device may receive a response to the query that includes the identification information in a plurality of fields of information as illustrated by the above-noted example fields of information. The public safety officer must then compare the received information in each of the plurality of fields of information to the person or object at the incident scene to make sure that the person or object has been correctly identified.

However, comparing the received information to the person or object at the incident scene may consume valuable time and effort of the public safety officer that may prevent the public safety officer from completing other assigned tasks and/or may reduce the attentiveness of the public safety officer. For example, depending on the type of identification requested by the public safety officer, there may be many fields of information to compare for accuracy that may delay the public safety officer from performing other tasks. In some situations, any amount of time saved for a public safety officer handling a public safety incident may prove valuable. Thus, there is a technological problem regarding the providing of query response information (for example, identification information) to a public safety officer for verification of an identity of an object of interest at an incident scene.

Disclosed are, among other things, a process, device, and system to display information received in a query response in a manner that allows the public safety officer to more efficiently verify the identity of an object of interest (for example, a person or a physical object) at an incident scene based on the displayed information. For example, a communication device performs image-assisted field verification of one or more information fields of a query response to display query response information in one or more information fields for which the received information (i) is unverified by one or more images of the person or object captured by a camera or (ii) is determined to be a mismatch (in other words, inconsistent) with the one or more images of the person or object captured by the camera. The communication device may compare a captured image(s) of the person or object to the information received in response to the query. When the received information in an information field matches (in other words, is consistent) with a corresponding characteristic of the person or object based on the captured image(s) by a predetermined confidence threshold, the communication device may de-prioritize the matching/consistent information field (for example, hair color). On the other hand, when the received information in an information field is unverifiable or determined to be a mismatch (in other words, inconsistent) with a corresponding characteristic of the person or object based on the captured image(s), the communication device may prioritize the unverified or mismatching/inconsistent information field (for example, height). Continuing the above examples, the communication device may display the received height information for the public safety officer to verify but may not display the received hair color information that was automatically verified by the communication device. As another example, the communication device may display the received height information at a top of a prioritized list of fields of information with a mismatch/inconsistent indication while displaying the received hair color information lower on the prioritized list of fields of information with a matching/consistent indication.

Accordingly, the disclosed process, device, and system addresses the above-noted technological problem by more efficiently displaying query response information to a public safety officer and/or by displaying less, but more relevant, query response information to the public safety officer. This improvement in the displaying of query response information may allow the public safety officer to spend less time verifying the identification of a person or object so that the public safety officer may have more time to perform other tasks. This saved time may be very beneficial because, in some situations, any amount of time saved for a public safety officer handling a public safety incident may prove valuable in discovering other information and/or spending additional time becoming aware of his or her surroundings so that the officer may become less likely to miss a dangerous person or object approaching.

One embodiment provides a communication device that may include a user interface and a first electronic processor communicatively coupled to the user interface. The first electronic processor may also be communicatively coupled to a camera that is configured to capture an image of an object. The first electronic processor may be configured to receive a request to identify the object, and transmit a query to a remote electronic processor in response to the request and based on the request. The first electronic processor may be further configured to receive a response to the query from the remote electronic processor. The response may include stored information about the object included in each of a plurality of fields of information. The first electronic processor may be further configured to receive the image of the object from the camera, and identify, from the image, visually descriptive text information describing the object. At least a portion of the visually descriptive text information may be categorized into the plurality of fields of information. The first electronic processor may be further configured to compare, within each field of the plurality of fields of information, the stored information and the visually descriptive text information, and determine a confidence level of a comparison between the stored information and the visually descriptive text information for each field of the plurality of fields of information. The first electronic processor may be further configured to display, on the user interface, the stored information in one or more fields of the plurality of fields of information for which the confidence level of the comparison is below a predetermined threshold. The stored information displayed on the user interface may be categorized according to the plurality of fields of information.

Another embodiment provides a process of displaying information received in a query response. The process may include receiving, with a first electronic processor of a communication device, a request to identify an object. The process may further include transmitting, with the first electronic processor, a query to a remote electronic processor in response to the request and based on the request. The process may further include receiving, with the first electronic processor, a response to the query from the remote electronic processor. The response may include stored information about the object included in each of a plurality of fields of information. The process may further include receiving, with the first electronic processor, an image of the object captured by a camera. The process may further include identifying, from the image and with the first electronic processor, visually descriptive text information describing the object. At least a portion of the visually descriptive text information may be categorized into the plurality of fields of information. The process may further include comparing, with the first electronic processor and within each field of the plurality of fields of information, the stored information and the visually descriptive text information. The process may further include determining, with the first electronic processor, a confidence level of a comparison between the stored information and the visually descriptive text information for each field of the plurality of fields of information. The process may further include displaying, on a user interface of the communication device, the stored information in one or more fields of the plurality of fields of information for which the confidence level of the comparison is below a predetermined threshold. The stored information displayed on the user interface may be categorized according to the plurality of fields of information.

Another embodiment provides an electronic computing device including an electronic processor communicatively coupled to a camera configured to capture an image of an object. The electronic processor may be configured to receive, from a communication device, a query. The query may include a request to identify the object. The electronic processor may be further configured to generate a response to the query. The response may include stored information about the object included in each of a plurality of fields of information. The electronic processor may be further configured to receive the image of the object from the camera and identify, from the image, visually descriptive text information describing the object. At least a portion of the visually descriptive text information may be categorized into the plurality of fields of information. The electronic processor may be further configured to compare, within each field of the plurality of fields of information, the stored information and the visually descriptive text information, and determine a confidence level of a comparison between the stored information and the visually descriptive text information for each field of the plurality of fields of information. The electronic processor may be further configured to transmit, to the communication device, the response to the query and the confidence level of the comparison for each field of the plurality of fields of information. The communication device may be configured to display, on a user interface, the stored information in one or more fields of the plurality of fields of information for which the confidence level of the comparison is below a predetermined threshold. The stored information displayed on the user interface may be categorized according to the plurality of fields of information.

Each of the above-mentioned embodiments will be discussed in more detail below, starting with example communication system and device architectures of the system in which the embodiments may be practiced, followed by an illustration of processing steps for achieving the process, device, and system for an electronic digital assistant. Further advantages and features consistent with this disclosure will be set forth in the following detailed description, with reference to the figures.

1. Communication System and Device Structures a. Communication System Structure

Figure 1B:
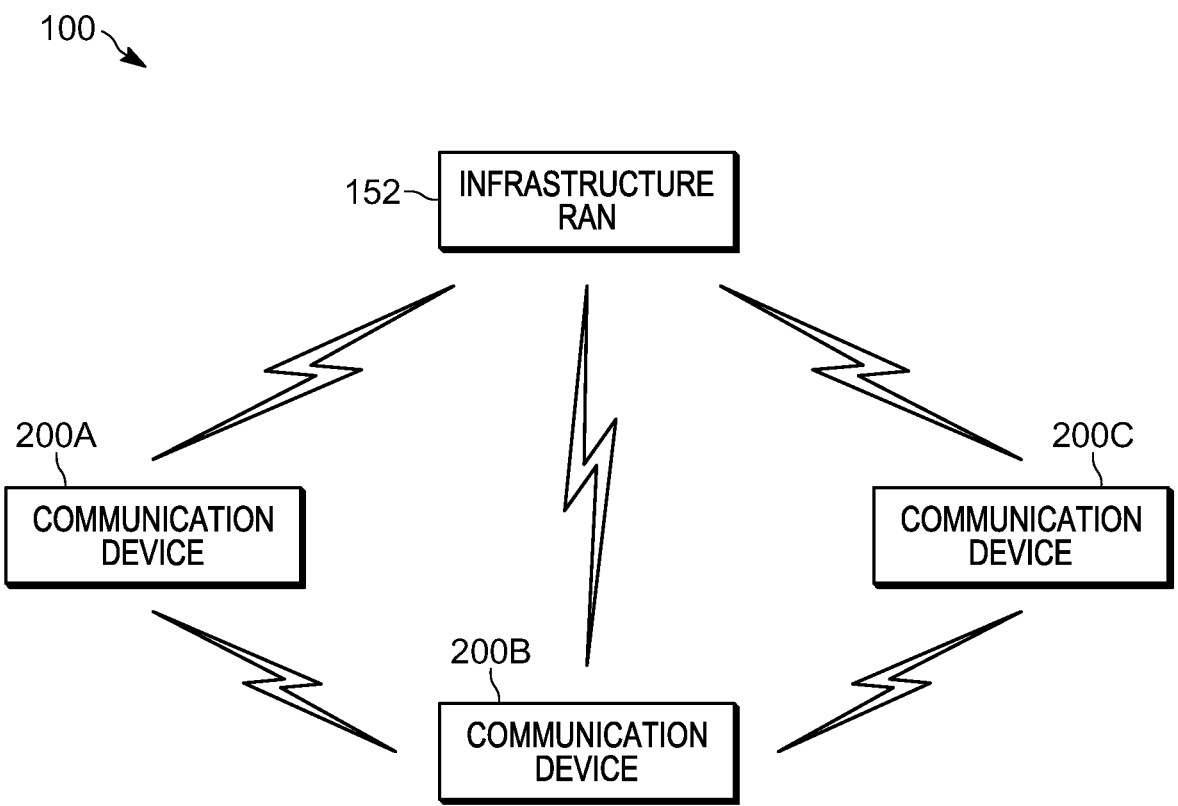

Referring now to the drawings, and in particular FIG. 1A, a communication system diagram illustrates a system 100 of devices including a first set of devices that a user 102 (illustrated in FIG. 1A as a public safety officer, for example, a police officer) may wear, for example, a primary battery-powered portable radio 104 used for narrowband and/or broadband direct-mode or infrastructure communications, a battery-powered radio speaker microphone (RSM) video capture device 106, a laptop 114 having an integrated video camera and used for data applications for example incident support applications, smart glasses 116 (for example, which may be virtual reality, augmented reality, or mixed reality glasses), sensor-enabled holster 118, and/or biometric sensor wristband 120. Although FIG. 1A illustrates only a single user 102 with a respective first set of devices, in other embodiments, the single user 102 may include additional sets of same or similar devices, and additional users may be present with respective additional sets of same or similar devices as indicated by FIG. 1B. As an example, additional users may be other public safety officers performing tasks at an incident scene, dispatchers providing information to public safety officers, public safety commanders or incident scene commanders supervising and assigning tasks to other public safety officers, and the like.

System 100 may also include a vehicle 132 associated with the user 102 having an integrated mobile communication device 133, an associated vehicular video camera 134, and a coupled vehicular transceiver 136. Although FIG. 1A illustrates only a single vehicle 132 with a single mobile communication device 133, respective single vehicular video camera 134 and/or microphone, and a single coupled vehicular transceiver 136, in other embodiments, the vehicle 132 may include additional same or similar mobile communication devices, video cameras, microphones, and/or transceivers, and additional vehicles may be present with respective additional sets of mobile communication devices, video cameras, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The portable radio 104, in particular, may be any communication device used for infrastructure RAN or direct-mode media (for example, voice, audio, video, etc.) communication via a long-range wireless transmitter and/or transceiver that has a transmitter transmit range on the order of miles, for example, 0.5-50 miles, or 3-20 miles (for example, in comparison to a short-range transmitter for example a Bluetooth, Zigbee, or NFC transmitter) with other communication devices and/or the infrastructure RAN 152. The long-range transmitter may implement a direct-mode, conventional, or trunked land mobile radio (LMR) standard or protocol, for example, European Telecommunications Standards Institute (ETSI) Digital Mobile Radio (DMR), a Project 25 (P25) standard defined by the Association of Public Safety Communications Officials International (APCO), Terrestrial Trunked Radio ('TETRA), or other LMR radio protocols or standards. In other embodiments, the long range transmitter implements the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented. In still further embodiments, the long range transmitter may implement a Wi-Fi protocol perhaps in accordance with an IEEE 802.11 standard (for example, 802.11a, 802.11b, 802.11g) or a WiMAX protocol perhaps operating in accordance with an IEEE 802.16 standard.

In the example of FIG. 1A, the portable radio 104 forms the hub of communication connectivity for the user 102, through which other accessory devices, for example, a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (for example a USB port, an Ethernet port, an audio jack, etc.) for direct electric coupling with the RSM video capture device 106, laptop 114, and/or smart glasses 116. In some embodiments, the portable radio 104 contains a short-range transmitter (for example, in comparison to the long-range transmitter for example a LMR or Broadband transmitter) and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters. In other embodiments, the RSM video capture device 106, the laptop 114, and/or the smart glasses 116 contain their own long-range transceivers and communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single communication device to communicate with one or more group members (not shown) associated with a particular group of devices at a same time.

Additional features may be provided at the RSM video capture device 106 as well. For example, a display screen 110 is provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 is replaced with a more limited body worn camera that includes the video camera 112 and/or microphone noted above for capturing audio and/or video, but may forego one or more of the features noted above that transform the body worn camera into a more full-featured RSM, for example the separate physical PTT switch 108 and the display screen 110, and remote microphone functionality for voice communications in cooperation with portable radio 104.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, for example a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen is, for example, an LCD screen or an OLED display screen. In some embodiments, a touch sensitive input interface is incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information, for example, text, images, or video received from the portable radio 104 or directly from the infrastructure RAN 152. In some embodiments, the smart glasses 116 includes its own long-range transceiver and communicates with other communication devices and/or with the infrastructure RAN 152 or vehicular transceiver 136 directly without passing through portable radio 104. In some embodiments, an additional user interface mechanism, for example, a touch interface or gesture detection mechanism is provided at the smart glasses 116 that allows the user 102 to interact with the display elements displayed on the smart glasses 116 or projected into the user's 102 eyes, or to modify operation of the digital imaging device. In other embodiments, a display and input interface at the portable radio 104 is provided for interacting with smart glasses 116 content and modifying operation of the digital imaging device, among other possibilities.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 also detects whether the first responder's hand is resting on the weapon even if it has not yet been removed from the holster and provide such information to portable radio 104. In some embodiments, a weapon of the user 102 includes a sensor that detects when the weapon is discharged. The detected discharge may be reported to the portable radio 104, for example. Other possibilities exist as well.

The biometric sensor wristband 120 may be an electronic device for tracking an activity of the user 102 or a health status of the user 102, and may include one or more movement sensors (for example, an accelerometer, magnetometer, and/or gyroscope) that may periodically or intermittently provide to the portable radio 104 indications of orientation, direction, steps, acceleration, and/or speed, and indications of health, for example, one or more of a captured heart rate, a captured breathing rate, and a captured body temperature of the user 102, perhaps accompanying other information. In some embodiments, the biometric sensor wristband 120 includes its own long-range transceiver and communicates with other communication devices and/or with the infrastructure RAN 152 or vehicular transceiver 136 directly without passing through portable radio 104.

Although the biometric sensor wristband 120 is shown in FIG. 1A as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor. In some embodiments, the biometric sensor wristband 120 or another device of the user 102 detects characteristics of the environment of the user 102 (for example, temperature, humidity, air quality, and the like).

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, Bluetooth Low Energy, WiFi, Near Field Communication (NFC), Radio Frequency ID (RFID) or other short-range wireless protocol having a transmission range on the order of meters, tens of meters, or hundreds of meters.

The portable radio 104 and/or RSM video capture device 106 (or any other device in FIG. 1A, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device is, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices for example the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. In some embodiments, the mobile communication device 133 includes the vehicular transceiver 136 and/or the vehicular video camera 134 integrated therewith, and operates to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above. The omni-directional or uni-directional microphone, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of the mobile communication device 133 perhaps in cooperation with video camera 134 (which may include a visible-light camera, an infrared camera, a time-of-flight depth camera, and/or a light detection and ranging (LiDAR) device). Command information and/or status information, for example, location and speed may be exchanged with the self-driving vehicle via the VAN and/or the PAN (when the PAN is in range of the VAN or via the VAN's infrastructure RAN link). In some embodiments, devices within the vehicle 132 communicate with devices in other vehicles via a Vehicular to Vehicular (V2V) Network.

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above is disposed, and similarly communicates with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN provides infrastructure communications to the other, depending on the situation and the types of devices in the VAN and/or PAN and provides interoperability and communication links between devices (for example video cameras) and sensors within the VAN and PAN.

Although the RSM 106, the laptop 114, and the vehicle 132 are illustrated in FIG. 1A as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras, for example, head-mounted cameras, other types of vehicular cameras, for example, roof-mounted cameras, video cameras located on a drone, or other types of audio and/or video recording devices accessible via a wired or wireless network interface same or similar to that disclosed herein. These other types of cameras and/or microphones may communicate captured images, video, and/or sound to other devices in the system 100 in the same or a similar manner as described previously herein with respect to the cameras and/or microphones of the RSM 106, the laptop 114, and the vehicle 132.

In some embodiments, one or more of the user 102, the vehicle 132, the portable radio 104, the RSM video capture device 106, and any other device in FIG. 1A is equipped with an environmental sensor, for example, a chemical, biological, radiological, nuclear, or explosive (CBRNE) sensor. Measurements made by the CBRNE sensor may be stored locally or transmitted via a transmitter or transceiver to other communication devices and/or to the infrastructure RAN 152.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1A, among other possibilities. At least one other terminal, for example used in conjunction with the communication devices, is a fixed terminal, for example a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology for example, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 implements a WLAN technology for example Wi-Fi perhaps operating in accordance with an IEEE 802.11 standard (for example, 802.11a, 802.11b, 802.11g) or for example a WiMAX perhaps operating in accordance with an IEEE 802.16 standard.

Infrastructure RAN 152 may additionally or alternatively operate according to an industry standard LMR wireless access technology for example, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

Group calls may be made between wireless and/or wireline participants in accordance with either a narrowband or a broadband protocol or standard. Group members for group calls may be statically or dynamically defined. That is, in a first example, a user or administrator working on behalf of the user indicates to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (for example, communication devices) could be provisioned in the network by the user or an agent, and then provided some form of group identity or identifier, for example. Then, at a future time, an originating user in a group may cause some signaling to be transmitted indicating that he or she wishes to establish a communication session (for example, group call) with each of the pre-designated participants in the defined group. In another example, communication devices dynamically affiliate with a group (and also disassociate with the group)

perhaps based on user input, and the switching and/or radio network tracks group membership and routes new group calls according to the current group membership.

In some instances, broadband and narrowband systems are interfaced via a middleware system that translates between a narrowband PTT standard protocol (for example, P25) and a broadband PTT standard protocol or application (for example, OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1A, such a middleware server is disposed in infrastructure RAN 152 at infrastructure controller 156 or at a separate cloud computing cluster 162 communicably coupled to infrastructure controller 156 via internet protocol (IP) network 160, among other possibilities.

The infrastructure RAN 152 is illustrated in FIG. 1A as providing coverage for the portable radio 104, RSM video capture device 106, laptop 114, smart glasses 116, and/or vehicle transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including a dispatch console 158 operated by a dispatcher. In other embodiments, additional fixed terminals, additional controllers, and additional dispatch consoles are disposed to support a larger geographic footprint and/or a larger number of mobile devices.

The infrastructure controller 156 illustrated in FIG. 1A, or some other back-end infrastructure device or combination of back-end infrastructure devices existing on-premises or in the remote cloud computing cluster 162 accessible via the IP network 160 (for example, the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, for example, the one set forth in FIG. 2, one or more of which may be executing none, all, or a portion of an electronic digital assistant service, sequentially or in parallel, across the one or more computing devices. The one or more computing devices comprising the cloud computing cluster 162 may be geographically co-located or may be separated by inches, meters, or miles, and inter-connected via electronic and/or optical interconnects. Although not shown in FIG. 1A, one or more proxy servers or load balancing servers may control which one or more computing devices perform any part or all of the electronic digital assistant service.

As shown in FIG. 1A, database(s) 164 may be accessible via the IP network 160 and/or the cloud computing cluster 162, and may include databases, for example, a long-term video storage database, a historical or forecasted weather database, an offender database perhaps including facial recognition images to match against, a cartographic database of streets and elevations, a traffic database of historical or current traffic conditions, a criminal records database, a vehicle identification database, or other types of databases. Databases 164 may further include all or a portion of the databases described herein as being provided at the infrastructure controller 156. In some embodiments, the databases 164 are maintained by third parties (for example, the National Weather Service or a Department of Transportation, respectively). As shown in FIG. 1A, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1A are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1A describes a communication system 100 generally as a public safety communication system that includes a user 102 generally described as a police officer and a vehicle 132 generally described as a police cruiser, in other embodiments, the communication system 100 is additionally or alternatively a retail communication system including a user 102 that is an employee of a retailer and a vehicle 132 that is a vehicle for use by the user 102 in furtherance of the employee's retail duties (for example, a shuttle or self-balancing scooter). In other embodiments, the communication system 100 is additionally or alternatively a warehouse communication system including a user 102 that is an employee of a warehouse and a vehicle 132 that is a vehicle for use by the user 102 in furtherance of the employee's retail duties (for example, a forklift). In still further embodiments, the communication system 100 is additionally or alternatively a private security communication system including a user 102 that is an employee of a private security company and a vehicle 132 that is a vehicle for use by the user 102 in furtherance of the private security employee's duties (for example, a private security vehicle or motorcycle). In even further embodiments, the communication system 100 is additionally or alternatively a medical communication system including a user 102 that is a doctor or nurse of a hospital and a vehicle 132 that is a vehicle for use by the user 102 in furtherance of the doctor or nurse's duties (for example, a medical gurney or ambulance). In still another example embodiment, the communication system 100 is additionally or alternatively a heavy machinery communication system including a user 102 that is a miner, driller, or extractor at a mine, oil field, or precious metal or gem field and a vehicle 132 that is a vehicle for use by the user 102 in furtherance of the miner, driller, or extractor's duties (for example, an excavator, bulldozer, crane, front loader). Other possibilities exist as well.

As mentioned previously, many of the devices shown in FIG. 1A (for example, the portable radio 104, the RSM video capture device 106, the laptop 114, the mobile communication device 133, the infrastructure controller 156, the dispatch console 158, and one or more computing devices in the cloud computing cluster 162) may be referred to as communication devices (for example, a communication device 200 as explained below with respect to FIG. 2). Although FIG. 1A shows multiple communication devices 200 associated with the user 102, in some embodiments, the communication system 100 includes communication devices 200 of multiple users. For example, as shown in FIG. 1B, the communication device 200A is associated with a first user, the communication device 200B is associated with a second user, and the communication device 200C is associated with a third user. As indicated by FIG. 1B, in some embodiments, the communication devices 200A, 200B, and 200C communicate with each other over the infrastructure RAN 152 and/or communicate with each other directly as described previously herein. Similarly, other devices, for example the dispatch console 158, may communicate with communication devices 200 of multiple users through the infrastructure RAN 152. In some embodiments, one or more users have multiple associated communication devices 200, for example, as shown in FIG. 1A.

b. Device Structure

Figure 2:
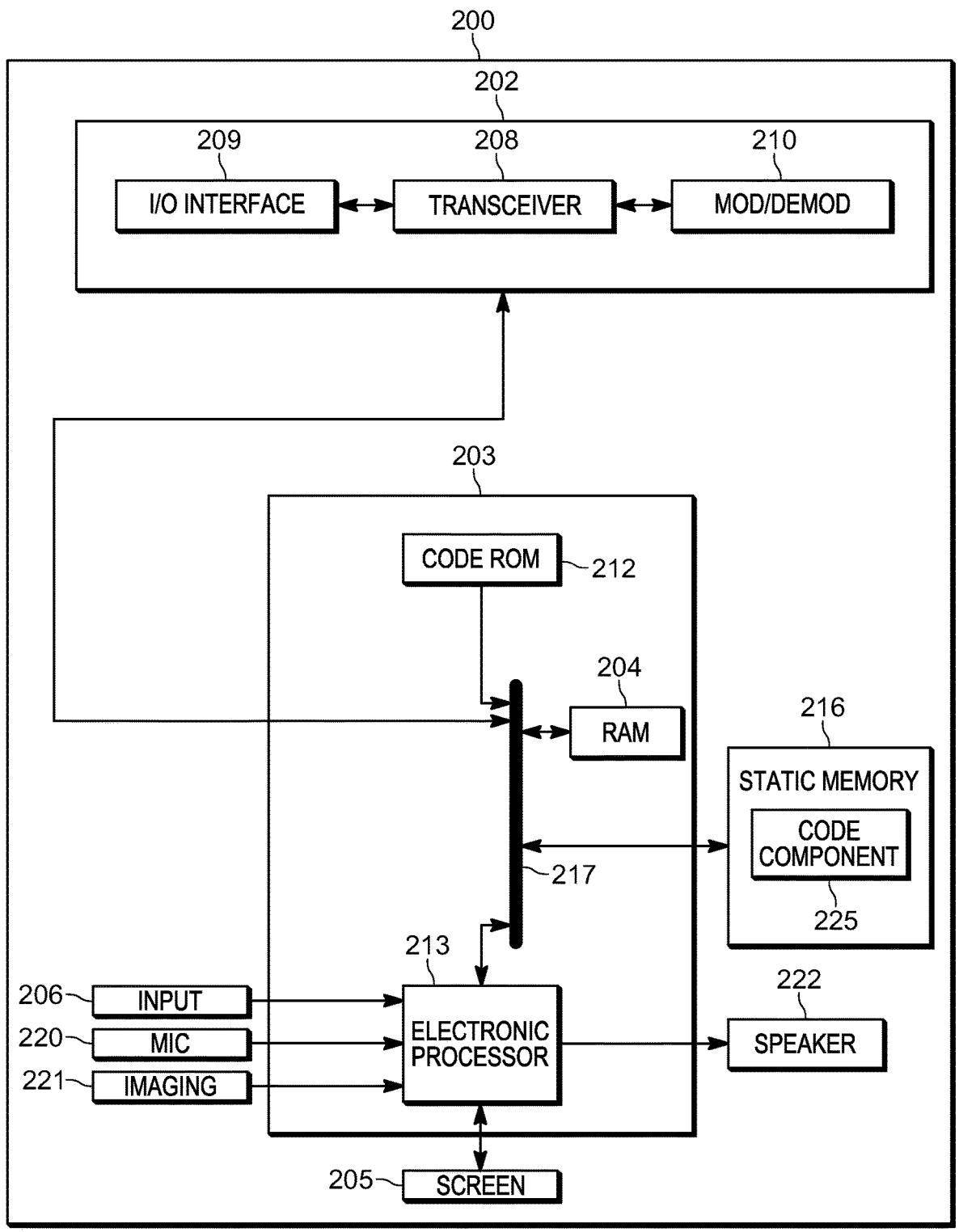
FIG. 2 is a device diagram showing a device structure of a communication device of the system of FIGS. 1A and 1B in accordance with some embodiments.

FIG. 2 sets forth a schematic diagram that illustrates a communication device 200 according to some embodiments of the present disclosure. The communication device 200 is, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1A, and/or is a distributed communication device across two or more of the foregoing (or multiple of a same type of one of the foregoing) and linked via a wired and/or wireless communication link(s). In some embodiments, the communication device 200 (for example, the portable radio 104) is communicatively coupled to other devices, for example, the sensor-enabled holster 118 as described above. In such embodiments, the combination of the portable radio 104 and the sensor-enabled holster 118 may be considered a single communication device 200.

While FIG. 2 represents the communication devices described above with respect to FIGS. 1A and 1B, depending on the type of the communication device, the communication device 200 may include fewer or additional components in configurations different from that illustrated in FIG. 2. For example, in some embodiments, the communication device 200 embodied as the infrastructure controller 156 does not include one or more of the screen 205, microphone 220, imaging device 221, and speaker 222. As another example, in some embodiments, the communication device 200 embodied as the portable radio 104 or the RSM video capture device 106 further includes a location determination device (for example, a global positioning system (GPS) receiver) as explained above. As another example, the communication device 200 embodied as the portable radio 104 or the RSM video capture device 106 may include a motor configured to vibrate to provide haptic notifications to the user 102. Other combinations are possible as well.

As shown in FIG. 2, the communication device 200 includes a communications unit 202 coupled to a common data and address bus 217 of a processing unit 203 that includes an electronic processor 213. The communication device 200 may also include one or more input devices (for example, keypad, pointing device, touch-sensitive surface, button, a microphone 220, an imaging device 221, and/or another input device 206) and an electronic display screen 205 (in other words, a display or a user interface) (which, in some embodiments, is a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. For example, the imaging device 221 is a camera. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices 200, for example a the portable radio 104, the laptop 114, the wireless RAN 152, and/or the mobile communication device 133.

For example, the communications unit 202 may include one or more wireless transceivers 208, for example a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, for example an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the other input device 206, and/or the speaker 222. Static memory 216 may store operating code 225 for the electronic processor 213 that, when executed, performs one or more of the steps set forth in FIG. 3 and the accompanying text.

The static memory 216 may comprise, for example, a hard-disk drive (HDD), an optical disk drive for example a compact disk (CD) drive or digital versatile disk (DVD) drive, a solid state drive (SSD), a tape drive, a flash memory drive, or a tape drive, and the like.

2. Processes for Image-Assisted Field Verification of a Query Response

In some embodiments, an individual component and/or a combination of individual components of the system 100 may be referred to as an electronic computing device that implements an electronic digital assistant as mentioned above. For example, the electronic computing device is a single electronic processor (for example, the electronic processor 213 of the portable radio 104). In other embodiments, the electronic computing device includes multiple electronic processors distributed remotely from each other. For example, the electronic computing device is implemented on a combination of at least two of the electronic processor 213 of the portable radio 104, the electronic processor 213 of the infrastructure controller 156, and the electronic processor 213 of a back-end device in the cloud computing cluster 162 accessible via the IP network 160. In other words, the electronic computing device may include a single communication device (for example, the portable radio 104 or the RSM video capture device 106) in some embodiments or may include multiple communication devices (for example, the portable radio 104, the infrastructure controller 156, and a back-end device in the cloud computing cluster 162) in some embodiments. In some embodiments, the electronic digital assistant/virtual partner may include a local electronic digital assistant/virtual partner implemented by an electronic processor 213 of a communication device 200 of a public safety officer and a remote electronic digital assistant/virtual partner implemented by one or more electronic processors of the electronic processor 213 of the infrastructure controller 156, the electronic processor 213 of a back-end device in the cloud computing cluster 162, and other electronic processors of other devices.

To use the electronic digital assistant implemented by the electronic computing device, the user 102, for example, provides an oral query that is received by the microphone 220 of the communication device 200. The electronic computing device receives signals representative of the oral query (in other words, audio data) from the microphone 220 and analyzes the signals to determine the content of the oral query. For example, the electronic computing device includes a natural language processing (NLP) engine configured to determine the intent and/or content of the oral query. The electronic computing device may also be configured to determine a response to the oral query (for example, by retrieving stored data or by requesting data from the database(s) 164) and provide the response to an output device of the communication device 200 (for example, one or more of the speaker 222 via a generated audio response and the screen 205 via a generated text-based response). In other words, one or more of the communication devices 200, embodied in one or more of the communication devices of FIG. 1A, for example the portable radio 104, the dispatch console 158, the infrastructure controller 156, and/or cloud computing cluster 162 may include a natural language processing engine to analyze oral queries received by the microphone 220 of the communication device 200 and provide responses to the oral queries.

Although an oral query is described above, in some embodiments, the electronic computing device receives and responds to other types of queries and inputs. For example, the user 102 submits a text query to the electronic computing device by typing the text query into a hard keyboard input device or a soft keyboard input provided on the screen 205 of the communication device 200. As another example, the user 102 uses the imaging device 221 to capture an image or video (e.g., a series of images) of an area and presses a hard or soft key to send the image or video to the electronic computing device to, for example, allow the electronic computing device to identify an object in the image or video. As another example, the electronic computing device activates the electronic digital assistant in response to receiving a response to a previously-transmitted query.

As explained previously herein, a public safety officer may obtain identification information about people or objects of interest present at an incident scene by requesting that the communication device 200 perform a query to retrieve such identification information. However, comparing the received query response information to the person or object at the incident scene may consume valuable time and effort of the public safety officer that may prevent the public safety officer from completing other assigned tasks or may reduce the attentiveness of the public safety officer. Thus, there is a technological problem regarding the providing of query response information (for example, identification information) to a public safety officer for verification of an identity of a person or object at an incident scene.

Figure 3:
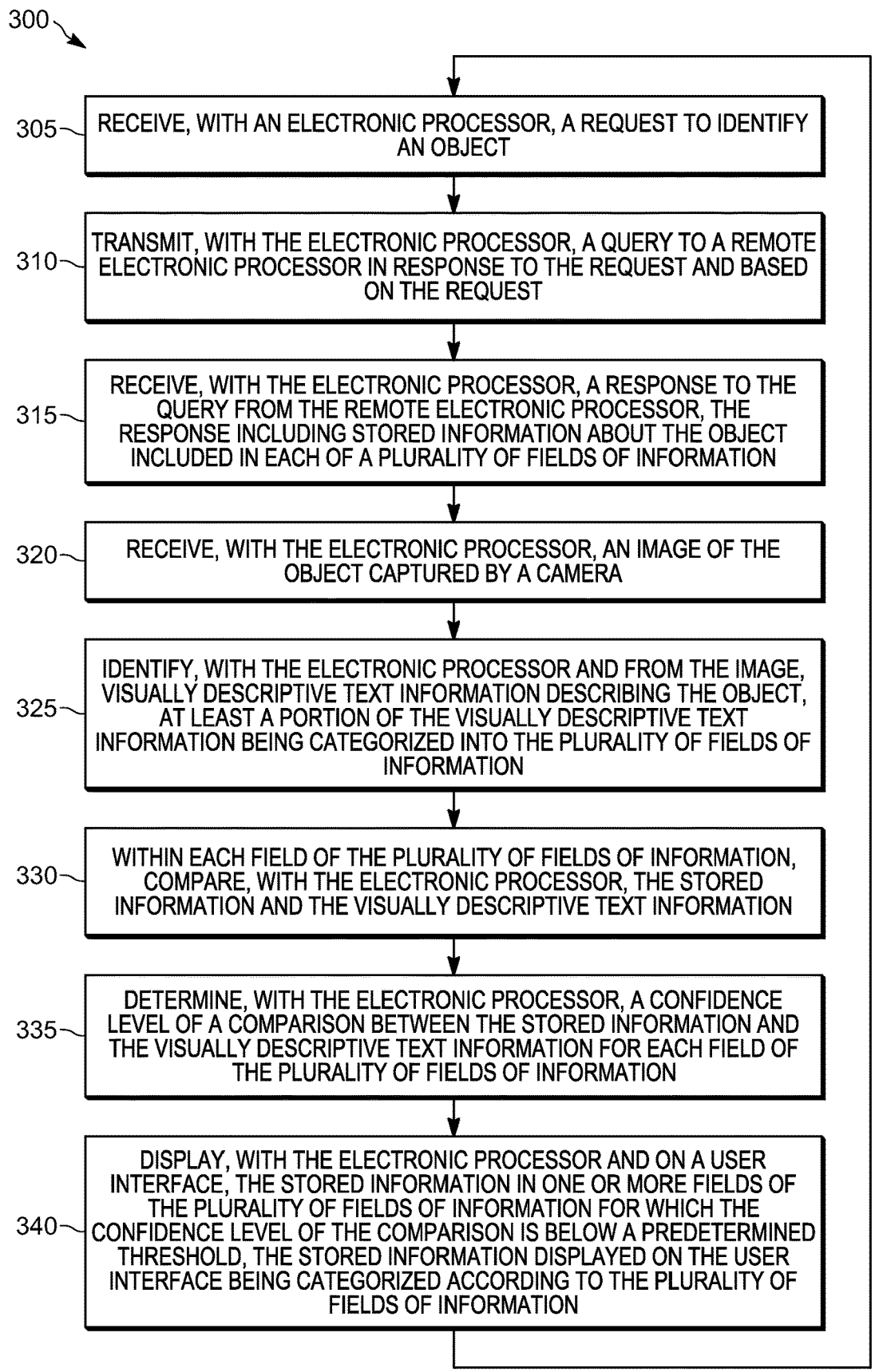
FIG. 3 illustrates a flow chart of a process performed by an electronic digital assistant for displaying fields of information received in a query response based on potential relevance of the fields of information in accordance with some embodiments.

To address this technological problem, the electronic computing device performs, for example, a process 300 of FIG. 3 to display information received in a query response in a manner that allows the public safety officer to more efficiently verify the identity of a person or object at an incident scene based on the displayed information. Performance of the process 300 allows the electronic computing device to more efficiently display query response information to the public safety officer and/or to display less, but only more relevant, query response information to the public safety officer. This improvement in the displaying of query response information may allow the public safety officer to spend less time verifying the identification of a person or object so that the public safety officer may have more time to perform other tasks. This saved time may be very beneficial because, in some situations, any amount of time saved for a public safety officer handling a public safety incident may prove valuable.

FIG. 3 illustrates a flowchart of the process 300 performed by the electronic computing device for displaying information received in a query response in a manner that allows the public safety officer to more efficiently verify the identity of a person or object at an incident scene based on the displayed information. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure.

At block 305, the electronic processor 213 of a communication device 200 of a public safety officer receives a request to identify an object (for example, a person, a vehicle, or another physical object). In some embodiments, the request to identify the object includes a user input received via a user interface of the communication device 200 and/or a voice command received via the microphone 220 of the communication device 200. In other words, the request may be an oral query, a text query, and/or the like provided as a user input by the public safety officer into the communication device 200 as explained previously herein. For example, the request may include a background check request of a person or a vehicle identification request of a vehicle from the public safety officer. In some embodiments, the request may involve the public safety officer capturing an image of the object (for example, a person, a license plate, or the like) or of an item related to the object (for example, an identification card of a person) using a camera of the communication device 200 and providing a user input requesting that the object be identified.

At block 310, the electronic processor 213 of the communication device 200 of the public safety officer transmits a query to a remote electronic processor in response to the request and based on the request. In some embodiments, the electronic processor 213 analyzes the received request (for example, using a natural language processing engine to analyze an oral query) to determine an intent and/or content of the request. Based on the determined intent and/or content of the request, the electronic processor 213 transmits a corresponding query to, for example, a remote device over the network 152. For example, in response to the communication device 200 receiving a request to perform a background check of John Smith, the communication device 200 transmits a query over the network 152 to cloud computing cluster 162, a remote server, or the like to retrieve background information on John Smith from the database(s) 164. In some embodiments, the communication device 200 establishes a communication path with a database 164 of a public safety agency (for example, a criminal records database) and transmits the request to the database 164 for information stored in the database 164 related to John Smith. In some embodiments, the database 164 additionally or alternatively includes driver license information, vehicle identification information, and/or the like.

In some embodiments, the request may specify fields of information about the object that are to be requested and retrieved by the communication device 200. For example, the public safety officer may select fields of information on the user interface of the communication device 200 (for example, height, weight, hair color, eye color, criminal record, and the like). In some embodiments, the communication device 200 may be pre-configured to request and retrieve certain fields of information based on the type of request received by the communication device 200 from the public safety officer. For example, when the officer provides an oral query that requests "a license plate check for license plate ABC-123," the communication device 200 may be pre-configured to request the following fields of information related to a vehicle corresponding to the license plate ABC-123: make, model, year, color, registered owner, and whether the vehicle has been reported as stolen. In some embodiments, the fields of information provided in response to the request may be determined by the remote electronic processor and/or the database 164. For example, all available fields of information stored in the database 164 about the object may be provided in response to the request.

In some embodiments where the request involves the public safety officer capturing an image of the object or of an item related to the object (for example, an identification card of a person) using a camera of the communication device 200, the communication device 200 may transmit the captured image to the remote electronic processor along with the query, and the remote electronic processor may use image analysis techniques to determine an identification of the object for which to retrieve information from a database 164. For example, the remote electronic processor may use facial recognition techniques to identify a person or may use optical character recognition techniques to identify a license plate number from a license plate or a name of a person included on an identification card. In other embodiments, the electronic processor 213 of the communication device 200 of the public safety officer may perform these image analysis techniques on the captured image to identify the object and may include the identification of the object in the query transmitted to the remote electronic processor. In other words, the communication device 200 may locally use image analysis techniques to identify the object in an image in some embodiments.

At block 315, the electronic processor 213 of the communication device 200 of the public safety officer receives a response to the query from the remote electronic processor. For example, one or more remote electronic processors of the cloud computing cluster 162 may retrieve information about the object from the database(s) 164 and transmit the response including the information to the communication device 200 of the public safety officer. In some embodiments, the response includes stored information about the object included in each of a plurality of fields of information. For example, when the object is a person, the plurality of fields of information may include two or more of the following fields of information about the object: name, height, weight, hair color, eye color, other distinguishing physical features (for example, description and location of one or more tattoos), criminal record, and the like. As another example, when the object is a vehicle, the plurality of fields of information may include two or more of the following fields of information about the object: make, model, year, color, registered owner, whether the vehicle has been reported as stolen, and the like. Other types of information, whether related to physical features or not, may be included in the plurality of fields of information about the object in other embodiments. In some embodiments, one or more fields of the plurality of fields of information provided in the response may be left blank and may not include any information. For example, the remote electronic processor may not be able to retrieve an eye color of the person. Accordingly, the eye color field of information in the response may be left blank or may otherwise indicate to the public safety officer that such information was unable to be retrieved. In other embodiments, the remote electronic processor may simply not include the eye color field of information in the response because the remote electronic processor was unable to retrieve such information.

At block 320, the electronic processor 213 of the communication device 200 of the public safety officer receives or accesses an image of the object captured by a physically or communicably coupled camera. In some embodiments, the image is a single image or is one of a series of images (in other words, a video). In some embodiments, the camera is an integrated camera included within a housing of the communication device 200 of the public safety officer (in other words, imaging device 221). In some embodiments, the camera is separate from the communication device 200 and may be included within a Personal Area Network of multiple devices carried and/or worn by the public safety officer as described previously herein (for example, a camera of the RSM video capture device 106 and/or smart glasses 116, a body-worn camera, and the like). In some embodiments, the camera is an external camera separate from the communication device 200 that communicates image data to the communication device 200 (for example, a vehicle camera, a surveillance/security camera, and/or the like). In some embodiments, the communication device 200 of the public safety officer may receive multiple images of the object. For example, a single camera may capture and provide multiple images of the object or different cameras may each capture and provide one or more images of the object. Different images may provide different viewing angles of the object and may accordingly allow different information about the object to be determined based on the images. In some embodiments, the one or more images accessed or received at block 320 include the captured image described above at block 305. However, in other embodiments, the one or more images accessed or received at block 320 do not include the captured image described above at block 305 (for example, in situations where an image was not captured at block 305 as part of the request).

At block 325, the electronic processor 213 of the communication device 200 of the public safety officer identifies, from the received image, visually descriptive text information describing the object. In some embodiments, at least a portion of the visually descriptive text information is categorized into the plurality of fields of information (for example, at least some of the plurality of fields of information explained previously with respect to the query response received at block 315). For example, when the object is a person, the visually descriptive text information may include height, weight, hair color, eye color, and the like. As another example, when the object is a vehicle, the visually descriptive text information may include make, model, color, and the like. In some embodiments, the visually descriptive text information may include additional or alternative types of information. In some embodiments, the electronic processor 213 uses image analysis techniques to determine the visually descriptive text information describing the object. In other words, in some embodiments, the visually descriptive text information is information about the object that is determined by the electronic processor 213 by analyzing one or more captured or received images of the object (for example, blonde hair, brown eyes, approximately six feet tall, approximately 180 pounds, and the like)

In some embodiments, the electronic processor 213 also uses image analysis techniques and/or other techniques to identify the object that is the subject of the request received from the public safety officer. For example, the electronic processor 213 uses image analysis techniques in combination with received audio to determine that the public safety officer is talking to a person that is standing in front of the public safety officer. The electronic processor 213 may be configured to determine that first received audio corresponds to the officer's voice and that second received audio corresponds to the person's voice. The electronic processor 213 may then use image analysis techniques to match the second received audio to captured images that indicate lip movement of the person to determine that the person with whom the officer is communicating is the person captured by the image. In response to receiving a request to identify an object from the officer (for example, a background check of the person) (at block 305), the electronic processor 213 may be configured to determine that the object is the person with whom the officer is communicating.

In other embodiments, the public safety officer may provide a user input on the user interface of the communication device 200 to indicate the object that is the subject of his or her request. For example, the public safety officer may use the communication device 200 to capture an image of the object (for example, taking a picture of a person or a vehicle). As another example, the public safety officer may provide a voice command or text command to the communication device 200 such as stating, "the suspect is in a red shirt and a blue hat," or "the vehicle to be searched is the blue truck." Based on the command from the public safety officer, the communication device 200 may leverage its own cameras, cameras included within its Personal Area Network, and/or external cameras nearby the location of the communication device 200 to capture one or more images of the object that match the command from the public safety officer (for example, using image analysis techniques to identify characteristics of an object that match the characteristics included in the command). For example, the communication device 200 may send the characteristics of the object included in the command to other devices to allow these other devices to also use image analysis techniques to identify characteristics of an object that match the characteristics included in the command. In some embodiments, the communication device 200 displays an image of the object and requests a user input (for example, via the screen 205 or the microphone 220) from the public safety officer to confirm that the correct/desired object has been identified by the electronic processor 213 of the communication device 200.

In some embodiments, the electronic processor 213 of the communication device 200 of the public safety officer is configured to receive the image from the camera (at block 320) and identify the visually descriptive text information describing the object (at block 325) in response to at least one of receiving the request to identify the object (at block 305), transmitting the query to the remote electronic processor (at block 310), and receiving the response to the query from the remote electronic processor (at block 315). In other words, the electronic processor 213 may be triggered to perform blocks 320 and 325 in response to any one of the above-noted events occurring and/or in response to other events occurring such that blocks 320 and 325 of the process 300 may be performed after block 305, after block 310, or after block 315 according to different embodiments.

In some embodiments, the electronic processor 213 is configured to identify at least a portion of the visually descriptive text information describing the object based on an image analytics classifier configured to instruct the electronic processor 213 to identify a characteristic of the object. In some embodiments, the image analytics classifier is an instruction that instructs the electronic processor 213 to attempt to determine a certain characteristic of the object from one or more captured and/or received images using image analysis techniques. For example, image analytics classifiers instruct the electronic processor 213 to determine one or more of the fields of information included in the plurality of fields of information explained above (for example, extract the height of a person, extract the weight of a person, extract information regarding the presence of a tattoo on certain body part of a person, and the like). In some embodiments, image analytics classifiers indicate an image analysis technique or algorithm for the electronic processor 213 to use to analyze one or more images to determine a desired characteristic of an object included in the one or more images. In some embodiments, the electronic processor 213 may generate an image analytics classifier for itself in response to and based on a command from the public safety officer that includes one or more characteristics of the object to be determined (for example, a color of the red shirt, blue hat, or blue truck of the examples explained previously herein). In some embodiments, one or more default image analytics classifiers are pre-stored on the memory 216 of the communication device 200. The electronic processor 213 may retrieve the default image analytics classifiers in response to and based on requests to identify different objects received by the communication device 200 at block 305. For example, when the request is an oral query that requests "a license plate check for license plate ABC-123," the electronic processor 213 may be configured to retrieve default image analytics classifiers that include the following fields of information related to a vehicle: make, model, color, and the like. As another example, when the request relates to a person, the electronic processor 213 may be configured to retrieve different default image analytics classifiers that include the following fields of information: height, weight, hair color, eye color, and the like. In some embodiments, the memory 216 is configurable/programmable by a user to set and/or adjust the default image analytics classifiers for each type of request. In some embodiments, the electronic processor 213 is configured to categorize the visually descriptive text information describing the object into the plurality of fields of information described above based on the image analytics classifiers.

Although the above embodiments describe the image analytics classifiers as being pre-stored in the memory 216 of the communication device 200 of the public safety officer, in some embodiments, the electronic processor 213 is configured to additionally or alternatively receive one or more of the image analytics classifiers from the remote electronic processor of a remote device. In some embodiments, such remotely received image analytics classifiers may replace the image analytics classifiers stored in the memory 216 of the communication 200 such that the communication device 200 does not locally store the image analytics classifiers. In other embodiments, the remotely received image analytics classifiers may supplement the default image analytics classifiers stored in the memory 216 of the communication device 200. For example, the default image analytics classifiers for a received request related to a person may include the following fields of information: height, weight, hair color, and eye color. In addition to the default image analytics classifiers, the response to the query received from the remote electronic processor may include an additional image analytics classifier that instructs the electronic processor 213 of the communication device 200 of the public safety officer to attempt to determine, by using image analysis techniques on one or more captured or received images, whether the person has a tattoo located on a certain part of their body (for example, a neck tattoo). The remote electronic processor may determine to provide this additional image analytics classifier based on information retrieved from the database 164 that indicates that the person has a neck tattoo. Along similar lines, in some embodiments, the remote electronic processor provides all of the image analytics classifiers used by the electronic processor 213 of the communication device 200 to determine characteristics of the object that make up the visually descriptive text information describing the object (for example, based on the fields of information about the object that are available in the database 164). In other words, the fields of information provided in the query response may be converted to image analytics classifiers where applicable. For example, fields including height, weight, hair color, eye color, and presence of a tattoo may be converted to corresponding image analytics classifiers while fields including name and criminal record may not be converted to image analytics classifiers because such information may not be obtainable by analyzing an image of the person.

At block 330, the electronic processor 213 of the communication device 200 of the public safety officer compares the stored information about the object (received at block 315 in response to the query) and the visually descriptive text information describing the object (identified at block 325 by analyzing one or more images of the object) within each field of the plurality of fields of information. For example, the electronic processor 213 compares a "height" field value, a "weight" field value, and a "hair color" field value obtained from the stored information with a corresponding "height" field value, "weight" field value, and "hair color" field value of the visually descriptive text information determined by analyzing the one or more images of the object.

At block 335, the electronic processor 213 of the communication device 200 of the public safety officer determines a confidence level of a comparison between the stored information and the visually descriptive text information for each field of the plurality of fields of information. In some embodiments, the confidence level is a percentage or likelihood that the visually descriptive text information matches or mismatches the received stored information for each field of the plurality of fields of information. In other words, the confidence level indicates a determination by the electronic processor 213 of how similar the received stored information in a field of information is to the visually descriptive text information in a corresponding field of information.

In some embodiments, by using image analysis techniques to analyze one or more images of the object, the electronic processor 213 determines a characteristic value for each of the plurality of fields of information described above and a percentage value corresponding to how closely the determined characteristic value matches a corresponding stored value. For example, for a "hair color" field of the visually descriptive text information, the electronic processor 213 determines that the hair color of the person is blonde (characteristic value) and that there is an 80% chance (percentage value) that the characteristic value is accurate (for example, based on lighting on other details of the one or more images that may affect the determination of the characteristic value). Continuing this example, when a "hair color" field of the received stored information indicates that the hair color of the person is blonde, the electronic processor 213 may determine a confidence level of 80% that the hair color of the person matches the hair color included in the stored information. On the other hand, when the "hair color" field of the received stored information indicates that the hair color of the person is black, the electronic processor 213 may determine a confidence level of 10% that the hair color of the person matches the hair color included in the stored information (for example, because blonde hair is a substantially different color than black hair). However, according to a variation of the above example, when the "hair color" field of the received stored information indicates that the hair color of the person is orange, the electronic processor may determine a confidence level of 50% that the hair color of the person matches the hair color included in the stored information (for example, because orange hair is more similar in color to blonde hair than is black hair).

In some embodiments, the confidence level may indicate a percentage or likelihood of a mismatch between the received stored information and the visually descriptive text information in one or more fields of information. For example, the low confidence level of 10% described in the above example with respect to blonde hair and black hair may indicate a 90% likelihood that the stored information and the visually descriptive text information of the "hair color" field mismatch. In other words, the confidence level may indicate a percentage or likelihood that the two pieces of compared information within a field of information match with each other or a percentage or likelihood that the two pieces of compared information within a field of information do not match with each other.

As another example of the electronic processor 213 determining the confidence level of a comparison for a field of information, the electronic processor 213 receives stored information indicating that a person is six feet tall (included in the "height" field). When the "height" field of the visually descriptive text information indicates that the person is six feet, one inch tall, the electronic processor 213 may determine a confidence level of 90% that the height of the person matches the height included in the stored information (for example, because the two heights are only one inch in difference). On the other hand, when the "height" field of the visually descriptive text information indicates that the person is five feet, four inches tall, the electronic processor 213 may determine a confidence level of 20% that the height of the person matches the height included in the stored information (for example, because there is a greater difference, eight inches, between the two heights). In some embodiments, the confidence level is proportionate to a difference between the two pieces of compared information within each field of information. For example, for each inch difference between the stored height information and the visually descriptive text information corresponding to height, the electronic processor 213 may subtract ten percent from one hundred percent to determine the confidence level of the "height" field.

The above examples of determining the confidence level are merely examples. In some embodiments, other methods of determining the confidence level may be used. In some embodiments, the electronic processor 213 may be programmed by different users or public safety agencies to be more or less strict when determining the confidence level for each field of information. In some embodiments, the confidence level may be a score on a scale of, for example, one to ten. In some embodiments, the confidence level may include multiple levels such as high confidence (a likely match/consistency), medium confidence (unknown/unverified whether the two pieces of information match or not), and low confidence (a likely mismatch/inconsistency). In some embodiments, the confidence level may be calculated differently for different fields of information.

For some fields of stored information received in the query response from the remote electronic processor, the electronic processor 213 may not be able to determine corresponding visually descriptive text information. For example, received stored information such as a criminal record of the person may not correspond to any visually descriptive text information determined by the electronic processor 213 analyzing an image of the object because such information is not obtainable merely by analyzing the image of the object. Accordingly, for such fields of stored information, the electronic processor 213 may be configured not to compare the stored information to visually descriptive text information in said field of information and/or may be configured to set a confidence level of said field of information to 0% or "not applicable" because there are not two pieces of information to be compared within the field of information. Similarly, when the electronic processor 213 identifies visually descriptive text information of an object (for example, eye color of a person) but the received stored information does not include information in a corresponding field of information, the electronic processor 213 may be configured not to compare the visually descriptive text information to stored information in said field of information and/or may be configured to set a confidence level of said field of information to 0% or "not applicable" because there are not two pieces of information to be compared within the field of information.

At block 340, the electronic processor 213 displays, on a user interface of the communication device 200 of the public safety officer, the received stored information in one or more fields of the plurality of fields of information for which the confidence level of the comparison is below a predetermined threshold (see FIGS. 4B and 4C). In some embodiments, the stored information displayed on the user interface is categorized according to the plurality of fields of information (see FIG. 4C). In other words, at block 340, the electronic processor 213 displays received stored information in the fields of information for which a low confidence level is determined to be present between the stored information and the visually descriptive text information (in other words, low confidence fields of information). Displaying of the stored information in such fields of information allows the public safety officer to quickly compare the stored information in these low confidence fields of information to the object at the incident scene to determine whether the object has been correctly identified. In some situations, the officer may not need to compare stored information in high confidence fields (in other words, fields of information with confidence levels above the predetermined threshold) to the object at the incident scene because the electronic processor 213 has already confirmed that the received stored information in the high confidence fields of information matches with the visually descriptive text information in the corresponding fields of information. Accordingly, using the communication device 200 that executes the process 300, the public safety officer may be able to more timely and efficiently verify the stored information (received in response to a query) by focusing only, or comparably more, on those fields/descriptors that are not a clear match rather than where there is likely a clear match, compared to situations in which the process 300 is not utilized.

In some embodiments, the predetermined threshold of the confidence level may be 50%, 60%, 70%, or the like. In some embodiments, the predetermined threshold of the confidence level may be the same for two or more fields of information or may be different for different fields of information. In some embodiments, the predetermined threshold of the confidence level may be user programmable such that the predetermined threshold may be adjusted for different use cases by, for example, different public safety agencies.

Figure 4A:
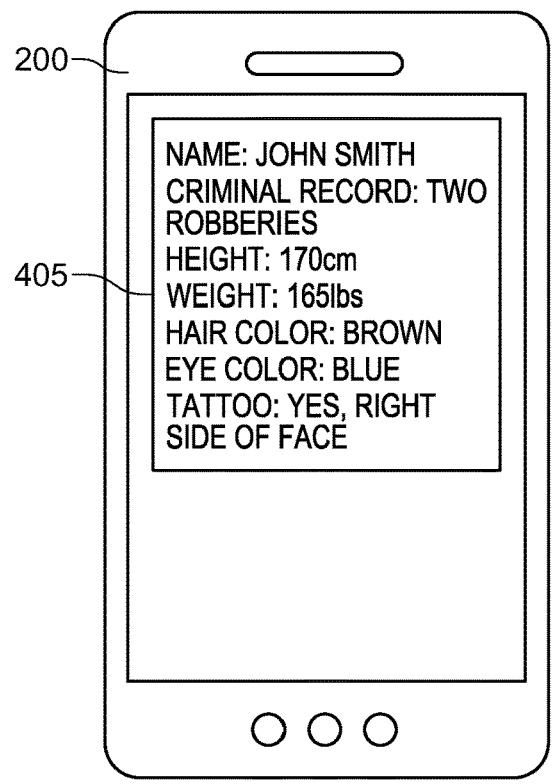
FIGS. 4A through 4C illustrate examples of displaying the fields of information of the query response of FIG. 3 on a user interface of a communication device included in the system of FIGS. 1A and 1B in accordance with some embodiments.

The information included in the fields of information may be displayed in many different manners on the user interface of the communication device 200 to indicate low confidence fields and to allow the public safety officer to more timely and efficiently verify the stored information received from remote electronic processor. FIGS. 4A through 4C illustrate examples of displaying the fields of information on a user interface 405 (for example, the screen 205) of the communication device 200 of the public safety officer.

FIG. 4A illustrates an example situation of displaying stored information received in response to the query where the communication device 200 does not execute the process 300. As shown in FIG. 4A, seven fields of information are displayed, and the public safety officer may be required to individually verify all fields that correspond to physical characteristics of the person. For example, the officer may verify that the name "John Smith" corresponds to the name on an identification card of the person acquired by the officer from the person at the incident scene. The officer also may verify the bottom five fields of information shown in FIG. 4A by observing corresponding characteristics of the person at the incident scene. However, as explained previously herein, such verification may be tedious and may consume valuable time of the officer that could be used to perform other tasks.

Figure 4B:
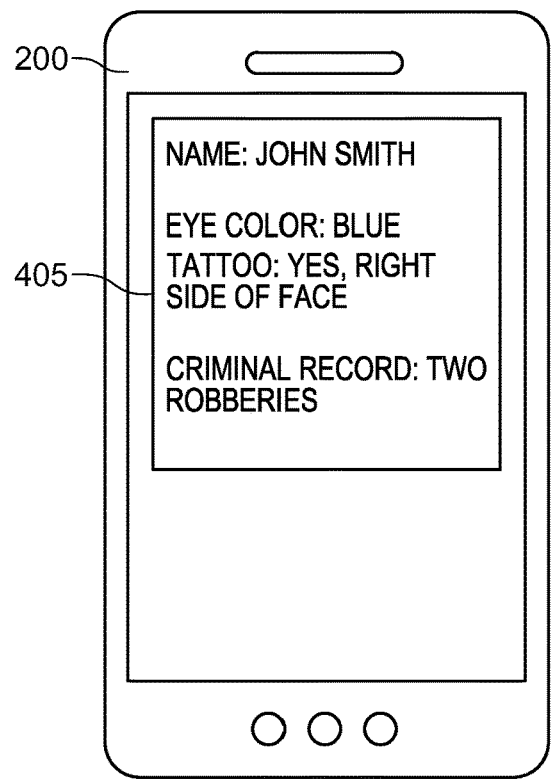

FIG. 4B illustrates an example of displaying stored information received in response to the query where the communication device 200 executes the process 300. As shown in FIG. 4B, less fields of information are displayed on the user interface 405 in FIG. 4B than in FIG. 4A because the electronic processor 213 is configured to only display the low confidence fields of information (for example, eye color and tattoo information). In other words, in the example of FIG. 4B, the electronic processor 213 is able to confirm that the other fields of information (for example, height, weight, and hair color) included confidence levels that indicated matches between the received stored information and the visually descriptive text information (for example, confidence levels above the predetermined threshold). Accordingly, the electronic processor 213 controls the user interface 405 to display only the stored information in the one or more fields of information for which the confidence level of the comparison is below a predetermined threshold (in other words, low confidence fields). Thus, the user interface 405 is less cluttered and more easily viewable for the public safety officer. Additionally, the public safety officer may save time by only verifying the two fields of low confidence information displayed in FIG. 4B instead of all five fields of information that are displayed in FIG. 4A.

Figure 4C:
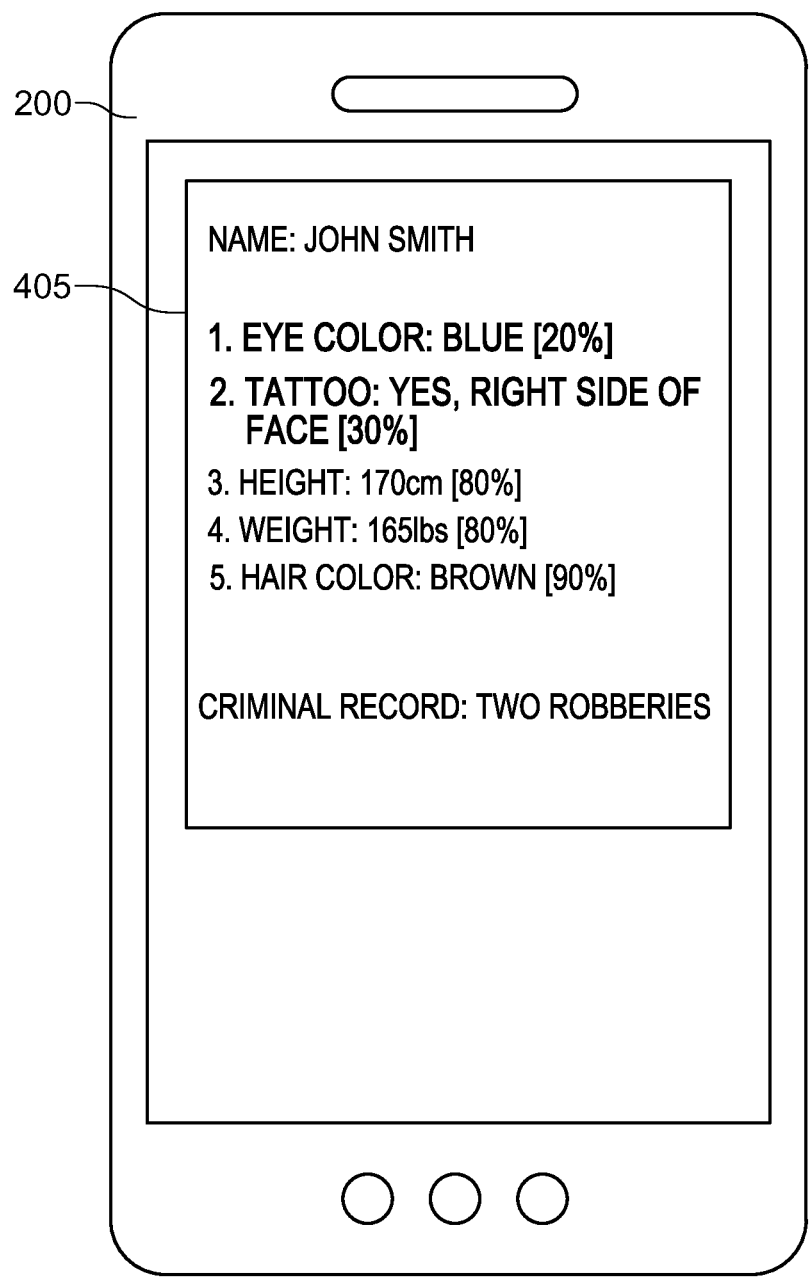

FIG. 4C illustrates another example of displaying received stored information where the communication device 200 executes the process 300. As shown in FIG. 4C and unlike the user interface 405 of FIG. 4B, the electronic processor may be configured to display, on the user interface 405, the stored information in one or more other fields of the plurality of fields of information for which the confidence level of the comparison is greater than or equal to the predetermined threshold (in other words, the high confidence fields such as height, weight, and hair color in this example). Displaying of these high confidence fields may allow the public safety officer to observe this information, if desired, without the need to verify that this information is accurate because the electronic processor 213 has already done so.

In some embodiments, the electronic processor 213 is configured to display, on the user interface 405, an indication of the confidence level of the comparison for each field of the one or more fields of the plurality of fields of information that are displayed on the user interface 405. This indication of the confidence level for each field of information may take numerous forms according to different embodiments. For example, the electronic processor 213 displays the stored information in a prioritized list based on the confidence level of the comparison for each field of the one or more fields of the plurality of fields of information that are displayed on the user interface 405. As shown in FIG. 4C, the five fields of information corresponding to physical characteristics of the object are shown in a prioritized list based on their respective confidence level. In other words, compared to FIG. 4A where the fields of information most in need of verification by the officer are shown at the bottom of the user interface 405, in FIG. 4C, these fields of information (eye color and tattoo information) are shown at a top of a list of fields of information corresponding to physical characteristics of the object. In some embodiments, the prioritized list includes the fields of information at the top of the list that are least likely to have matching/consistent values or most likely to have mismatching/inconsistent values.

Also as shown in FIG. 4C, as another example of an indication of the confidence level of the fields of information, the low confidence fields of information may be displayed in a different format than the high confidence fields of information. For example, the electronic processor 213 is configured to control a bolding property of and/or color-code the stored information in each field of the plurality of fields of information based on the confidence level of the comparison for each field of the one or more fields of the plurality of fields of information that are displayed on the user interface 405. For example, low confidence fields may be displayed in a bolded format, in red text, and/or with a red outline around the text while high confidence fields may be displayed in a non-bolded format, in green text, and/or with a green outline around the text. In some embodiments, more than two formats and/or colors may be used. For example, three formats and/or colors may be used to illustrate the three confidence levels of high confidence, medium/unknown/unverified confidence, and low confidence mentioned previously herein as an alternative example. Other variations exist as well.

Also as shown in FIG. 4C, as yet another example of an indication of the confidence level of the fields of information, the electronic processor 213 is configured to display a numerical value (for example, the percentages shown in FIG. 4C) indicating the confidence level of the comparison for each field of the one or more field of the plurality of fields of information that are displayed on the user interface 405. These numerical values may allow the officer to determine whether he or she desires to verify high confidence fields of information (for example, when the confidence level of a field of information is near the predetermined threshold).

Although the above examples of displaying an indication of the confidence level of the comparison for each field of information displayed on the user interface 405 are described with respect to FIG. 4C, these example indications may also be used in the first example of FIG. 4B where only the low confidence fields of information are displayed. Additionally, the above examples are non-limiting and other manners in which to display an indication of the confidence level of the comparison for the fields of information displayed on the user interface 405 may be used in other embodiments. For example, a line may be displayed between low confidence fields and the high confidence fields and/or such fields may be labeled and displayed on separate areas of the user interface 405.

Although the process 300 is explained above as transmitting a query (at block 310) in response to receiving a request to identify an object (at block 305), in some embodiments, the electronic processor 213 is configured to transmit the query and perform the process 300 without receiving an explicit request to identify an object. For example, a user of the communication device 200 may configure the electronic processor 213 to automatically generate a query in response to detecting certain objects (for example, license plates). Continuing this example, when a camera of the communication device 200 captures an image of a license plate, the electronic processor 213 may automatically generate a query related to the license plate and perform the remaining blocks of the process 300. For example, the electronic processor 213 may transmit an image of the license plate along with the query, and the remote electronic processor may use image analysis techniques to determine a license plate number (ABC-123) and license plate state (Illinois) for which to retrieve information from a license plate database 164. As noted above, in other embodiments, the communication device 200 of the public safety officer may perform the image analysis to determine the license plate number and the license plate state and may transmit this information to the remote electronic processor along with the query.

Although the process 300 is explained above as being performed by the electronic processor 213 of the communication device 200 of the public safety officer, in some embodiments, one or more remote electronic processors (for example, located at the cloud computing cluster 162 and providing a remote electronic digital assistant/virtual partner) perform some or all blocks of the process 300. For example, one or more remote electronic processors may not only receive the query from the communication device 200 of the public safety officer but may also receive one or more images of the object (at block 320) and perform blocks 325, 330, and 335 to determine the confidence levels of a comparison between retrieved stored information and visually descriptive text information describing the object determined from image analysis of the one or more images. Continuing this example, the one or more remote electronic processors may transmit the response to the query (in other words, the retrieved stored information) and the confidence level of the comparison for each field of the plurality of fields of information. The one or more remote electronic processors may also transmit a display format that indicates how the information included in the response to the query should be displayed on the communication device 200 of the public safety officer based on the confidence levels.

While a number of the embodiments and examples described above relate to public safety officers handling a public safety incident, in some embodiments, the disclosed prcoesses, devices, and systems are used in other contexts. For example, the disclosed processes, devices, and systems may be used by in a private security setting, an enterprise security setting, or a retail store or a warehouse, and the users may be security guards or employees. As another example, the disclosed processes, devices, and systems may be used by medical personnel in, for example, a hospital. As another example, the disclosed processes, devices, and systems may be used by miners at a mine, oil field, or precious metal or gem field.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms for example first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, device, or apparatus that comprises, has, includes, contains a list of elements does not include only those elements but may include other elements not expressly listed or inherent to such process, method, article, device, or apparatus. An element proceeded by "comprises . . . a," "has . . . a," "includes . . . a," or "contains . . . a" does not, without more constraints, preclude the existence of additional identical elements in the process, method, article, device, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the process and/or device described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a process as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A communication device comprising:
a user interface;
a first electronic processor communicatively coupled to the user interface and to a camera configured to capture an image of an object, wherein the first electronic processor is configured to
receive a request to identify the object,
transmit a query to a remote electronic processor in response to the request and based on the request,
receive a response to the query from the remote electronic processor, wherein the response includes stored information about the object included in each of a plurality of fields of information,
receive the image of the object from the camera,
identify, based on the query, the object in the image,
identify, from non-textual information included in the image and based on an image analytics classifier configured to instruct the first electronic processor to identify a characteristic of the object, visually descriptive text information describing the object,
categorize at least a portion of the visually descriptive text information into the plurality of fields of information based on the image analytics classifier,
within each field of the plurality of fields of information, compare the stored information and the visually descriptive text information,
determine a confidence level of a comparison between the stored information and the visually descriptive text information for each field of the plurality of fields of information, and
display, on the user interface, the stored information in one or more fields of the plurality of fields of information for which the confidence level of the comparison is below a predetermined threshold, wherein the stored information displayed on the user interface is categorized according to the plurality of fields of information.

2. The communication device of claim 1, wherein the request to identify the object includes at least one of the group consisting of a user input received via the user interface and a voice command received via a microphone.

3. The communication device of claim 1, wherein the first electronic processor is configured to display, on the user interface, the stored information in one or more other fields of the plurality of fields of information for which the confidence level of the comparison is greater than or equal to the predetermined threshold.

4. The communication device of claim 1, wherein the first electronic processor is configured to display, on the user interface, an indication of the confidence level of the comparison for each field of the one or more fields of the plurality of fields of information that are displayed on the user interface.

5. The communication device of claim 4, wherein the first electronic processor is configured to display the indication of the confidence level of the comparison for each field of the one or more fields of the plurality of fields of information that are displayed on the user interface by at least one of the group consisting of:
displaying the stored information in a prioritized list based on the confidence level of the comparison for each field of the one or more fields of the plurality of fields of information that are displayed on the user interface;
color-coding the stored information in each field of the plurality of fields of information based on the confidence level of the comparison for each field of the one or more fields of the plurality of fields of information that are displayed on the user interface; and
displaying a numerical value indicating the confidence level of the comparison for each field of the one or more fields of the plurality of fields of information that are displayed on the user interface.

6. The communication device of claim 1, wherein the first electronic processor is configured to receive the image from the camera and identify the visually descriptive text information describing the object in response to at least one of the group consisting of receiving the request to identify the object, transmitting the query to the remote electronic processor, and receiving the response to the query from the remote electronic processor.

7. The communication device of claim 1, wherein the first electronic processor is configured to receive the image analytics classifier from the remote electronic processor.

8. The communication device of claim 1, wherein the camera includes at least one of the group consisting of an integrated camera included within a housing of the communication device, a body-worn camera separate from the communication device, and an external camera separate from the communication device.

9. A method of displaying information received in a query response, the method comprising:
receiving, with a first electronic processor of a communication device, a request to identify an object;
transmitting, with the first electronic processor, a query to a remote electronic processor in response to the request and based on the request;
receiving, with the first electronic processor, a response to the query from the remote electronic processor, wherein the response includes stored information about the object included in each of a plurality of fields of information;
receiving, with the first electronic processor, an image of the object captured by a camera;
identifying, based on the query and with the first electronic processor, the object in the image;
identifying, with the first electronic processor and from non-textual information included in the image and based on an image analytics classifier configured to instruct the first electronic processor to identify a characteristic of the object, visually descriptive text information describing the object;
categorizing, with the first electronic processor, at least a portion of the visually descriptive text information into the plurality of fields of information based on the image analytics classifier;
within each field of the plurality of fields of information, comparing, with the first electronic processor, the stored information and the visually descriptive text information;
determining, with the first electronic processor, a confidence level of a comparison between the stored information and the visually descriptive text information for each field of the plurality of fields of information; and
displaying, on a user interface of the communication device, the stored information in one or more fields of the plurality of fields of information for which the confidence level of the comparison is below a predetermined threshold, the stored information displayed on the user interface being categorized according to the plurality of fields of information.

10. The method of claim 9, wherein receiving the request to identify the object includes receiving, with the first electronic processor, at least one of the group consisting of a user input received via the user interface and a voice command received via a microphone of the communication device.

11. The method of claim 9, further comprising displaying, on the user interface, the stored information in one or more other fields of the plurality of fields of information for which the confidence level of the comparison is greater than or equal to the predetermined threshold.

12. The method of claim 9, further comprising displaying, on the user interface, an indication of the confidence level of the comparison for each field of the one or more fields of the plurality of fields of information that are displayed on the user interface, wherein displaying the indication of the confidence level includes at least one of the group consisting of:

displaying the stored information in a prioritized list based on the confidence level of the comparison for each field of the one or more fields of the plurality of fields of information that are displayed on the user interface;

color-coding the stored information in each field of the plurality of fields of information based on the confidence level of the comparison for each field of the one or more fields of the plurality of fields of information that are displayed on the user interface; and displaying a numerical value indicating the confidence level of the comparison for each field of the one or more fields of the plurality of fields of information that are displayed on the user interface.

13. The method of claim 9, wherein receiving the image from the camera and identifying the visually descriptive text information describing the object includes receiving the image from the camera and identifying the visually descriptive text information describing the object in response to at least one of the group consisting of receiving the request to identify the object, transmitting the query to the remote electronic processor, and receiving the response to the query from the remote electronic processor.

14. The method of claim 9, further comprising:

receiving, with the first electronic processor, the image analytics classifier from the remote electronic processor.

15. The method of claim 9, wherein the camera includes at least one of the group consisting of an integrated camera included within a housing of the communication device, a body-worn camera separate from the communication device, and an external camera separate from the communication device.

16. An electronic computing device comprising:

an electronic processor communicatively coupled to a camera configured to capture image of an object, wherein the electronic processor is configured to receive, from a communication device, a query, wherein the query includes a request to identify the object, generate a response to the query, wherein the response includes stored information about the object included in each of a plurality of fields of information, receive the image of the object from the camera, identify, based on the query, the object in the image, identify, from non-textual information included the image and based on an image analytics classifier configured to instruct the electronic processor to identify a characteristic of the object, visually descriptive text information describing the object, categorize at least a portion of the visually descriptive text information into the plurality of fields of information based on the image analytics classifier, within each field of the plurality of fields of information, compare the stored information and the visually descriptive text information, determine a confidence level of a comparison between the stored information and the visually descriptive text information for each field of the plurality of fields of information, and transmit, to the communication device, the response to the query and the confidence level of the comparison for each field of the plurality of fields of information;

wherein the communication device is configured to display, on a user interface, the stored information in one or more fields of the plurality of fields of information for which the confidence level of the comparison is below a predetermined threshold, wherein the stored information displayed on the user interface is categorized according to the plurality of fields of information.

17. The electronic computing device of claim 16, wherein the communication device is configured to display, on the user interface, an indication of the confidence level of the comparison for each field of the one or more fields of the plurality of fields of information that are displayed on the user interface.

* * * * *